United States Patent [19]
Borojevic et al.

[11] Patent Number: 5,329,439
[45] Date of Patent: Jul. 12, 1994

[54] ZERO-VOLTAGE-SWITCHED, THREE-PHASE PULSE-WIDTH-MODULATING SWITCHING RECTIFIER WITH POWER FACTOR CORRECTION

[75] Inventors: Dusan Borojevic; Fred C. Lee; Vlatko Vlatkovic, all of Blacksburg, Va.

[73] Assignee: Center for Innovative Technology, Herndon, Va.

[21] Appl. No.: 898,900

[22] Filed: Jun. 15, 1992

[51] Int. Cl.$^5$ .................................. H02M 7/219
[52] U.S. Cl. .............................. 363/87; 363/127; 323/207
[58] Field of Search ............... 363/84, 87, 89, 127, 363/128; 323/207; H02M 7/219

[56] References Cited
PUBLICATIONS

"Designing a High Frequency Snubberless FET Power Inverter,"; Fang et al.; Proc. of POWERCON 11, D1-4, pp. 1-10, 1984.
"Design Considerations for High-Voltage High-Power Full-Bridge, Zero-Voltage-Switched PWM Converter"; Sabate et al; IEEE APEC '90 Proc., pp. 275-284, 1990.
"A Zero-Voltage Switched, Three-Phase PWM Switching Rectifier with Power Factor Correction,"; Borojevic et al; In High Frequency Power Conversion Conf. Rec. vol. 8, 1991, pp. 252-254.
"High-Voltage, High-Power, ZVS, Full-Bridge PWM Converter Employing an Active Snubber," IEEE APEC '91 Proc., pp. 158-163, 1991.

Primary Examiner—Emanuel T. Voeltz
Attorney, Agent, or Firm—Whitham & Marhoefer

[57] ABSTRACT

A three-phase, pulse-width-modulated, switching rectifier, with zero-voltage-switching.

2 Claims, 9 Drawing Sheets 5,329,439

ZERO-VOLTAGE-SWITCHED, THREE-PHASE PULSE-WIDTH-MODULATING SWITCHING RECTIFIER WITH POWER FACTOR CORRECTION

BACKGROUND OF THE INVENTION

1. Field of the Invention

This invention relates to a novel, single stage, isolated, three-phase switching rectifier capable of high switching speeds, and more particularly, to a six-step, zero-voltage-switching rectifier, with power factor correction.

2. Description of the Prior Art

Increasing emphasis on power quality has placed a stronger demand on the performance of ac-dc converters as the front end power processing block of many electronic systems. The requirements often include:

1. unity input power factor;
2. very low harmonic distortion of the input current;
3. transformer isolation between source and load; and
4. high efficiency and high power density.

These requirements are especially critical in high power applications, when three-phase ac-dc converters are usually employed.

Several types of three-phase ac-dc converters have been proposed which satisfy one or more of the above requirements. All of them use some form of high-frequency pulse-width-modulation (PWM) controlled rectification in order to minimize the size and weight of reactive filtering components. The first two requirements are easily met using the conventional six-step PWM technique for control of a three-phase forced-commutated bridge rectifier. Additionally, it provides maximum achievable output dc voltage without any low frequency harmonics, thus minimizing both the input and output filter requirements. Electrical isolation can be efficiently accomplished if the conversion process is divided in two stages: three-phase to high-frequency single-phase, cyclo-conversion and high-frequency ac to dc rectification. A small and efficient high-frequency transformer can then be placed between the two stages.

For an improved power density, higher switching frequencies should be used, but that would decrease efficiency due to the increased switching losses. These losses can be significantly reduced or eliminated if the zero-voltage-switching (ZVS) technique, similar to that used in the ZVS full-bridge (FB) PWM dc-dc converters as described in "Designing a High Frequency Snubberless FET Power Inverter," by Z. D. Fang et al., *Proc. of POWERCON* 11, D1-4, PP. 1-10, 1984, and "High-Voltage, High-Power, ZVS, Full-Bridge PWM Converter Employing an Active Snubber," by J. A. Sabate et al., *IEEE APEC '91 Proc.*, pp. 158-163, 1991, is implemented.

SUMMARY OF THE INVENTION

It is therefore an object of the present invention to provide a zero-voltage-switching pulse-width-modulating three-phase ac to dc converter that uses a six-step pulse-width-modulating pattern and is capable of implementing zero-voltage-switching by using the parasitic capacities of the switches and the transformer leakage inductance.

Briefly, this invention contemplates the provision of a three-phase, pulse-width-modulated, switching rectifier, with zero-voltage-switching.

The converter can be divided into several functional blocks. A cycloconverter bridge is used to synthesize the high-frequency ac voltage from the three-phase input voltages. A unity input power factor is obtained by using a modified six-step PWM technique in which the phase voltages that can be considered as a slowly changing dc value is pulse-width-modulated with the modulated pulse divided into two halves of opposite polarity. The high-frequency ac signal is transferred through the high-frequency transformer to provide input/output isolation. The secondary ac signal is rectified and filtered to obtain the desired output dc voltage. Additional control is implemented to assure that zero-voltage-switching (ZVS) is achieved on all bridge switches.

The modified six-step modulation scheme is based on the following key observations. Within any 60° interval between two zero crossings of input phase voltages, shown in FIG. 2, there are two line voltages that do not change sign. For example, in the 60° shaded area in FIG. 2, the line voltages $v_{12}=v_1-v_2$, and $v_{13}=v_1-v_3$ are positive, in the 60° shaded area in FIG. 2, the line and they both attain their maximum in this interval. Since the switching frequency of the converter is much higher than the line frequency, the two line voltages can be treated as slowly varying dc voltages. This, in turn, enables operation of the switches in the bridge within any 60° interval, in the same way as in zero-voltage-switching full-bridge (FB) phase shifted pulse-width-modulating (PWM) converter.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1B:
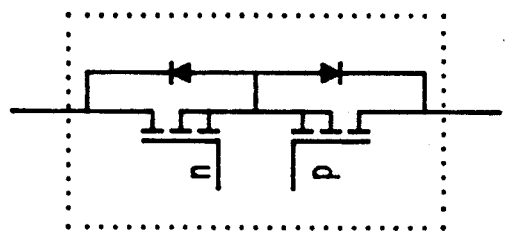
FIG. 1B is a realization of four-quadrant switches Q11–Q23 in accordance with the teachings of this invention.

Referring now to the drawings, and more particularly to FIG. 1, it shows the circuit diagram of the proposed converter. The converter can be divided into several functional blocks. The cycloconverter bridge comprised of switches $q_{11}$ to $q_{23}$ is used to synthesize a high-frequency ac voltage $v_p$ from the three-phase input voltages (labeled 1, 2, 3 in the drawing). A unity input power factor is obtained by using a modified six-step PWM technique, so that the output voltage $v_p$ has no dc component. Additional control is implemented to assure that ZVS is achieved on all bridge switches. The high-frequency ac signal is transferred through the high-frequency power transformer to provide input-/output isolation. A rectifier $D_a-D_d$ and a filter (L and C) rectify and filter the ac output of the transformer secondary to obtain a desired output dc voltage to load R.

In order to achieve the unity input power factor, the average (low-frequency components) of the input currents $i_1$, $i_2$, and $i_3$ have to be in-phase with the corresponding input phase voltages.

At any given instant, only one switch in the upper half and one switch in the bottom half of the bridge conducts, so input voltages are never shorted, and the free-wheeling path for the primary current $i_p$ is always provided.

In the prior art six-step PWM as described more fully in "Topologies and Analysis in PWM Inversion, Rectification and Cycloconversion," by K. D. T. Ngo, Ph.D. Thesis, Pasadena, Calif., California Institute of Technology, 1984 and "Three-Phase AC/DC PWM Converter with Sinusoidal Input Currents and Minimum Filter Requirements", by L. Malesani and P. Tenti, *IEEE Trans. on Industry Applications*, Vol. IA-23, no. 1, pp. 71-77, Jan./Feb. 1985, the input voltage period is divided into six 60° intervals. In each time interval none of the input phase voltages changes sign. One of these intervals is shaded in FIG. 2a, and a similar interval from $-30°$ to $30°$ is shown expanded in FIG. 3a. Within each interval, the phase voltage which has the largest absolute value and the sign opposite from the other two phase voltages, is denoted as: $v_x$. The other two phase voltages are denoted as $v_1$ and $v_z$, so that $|v_y| > |v_z|$ at the beginning of the interval. For example, during the interval shown in FIG. 3a, $v_x = v_1$, $v_y = v_2$, $v_z = v_3$. The individual duty cycles can then be selected as for $v_x > 0$:

$$d_{1x} = 1, d_{1y} = 0, d_{1z} = 0,$$

$$d_{2x} = 1 - d_m v_x / V_m,$$

$$d_{2y} = -d_m v_y / V_m,$$

$$d_{2z} = -d_m v_z / V_m,$$

and for $v_x < 0$:

$$d_{1x} = 1\ d_m v_x / V_m,$$

$$d_{1y} = d_m v_y / V_m,$$

$$d_{1z} = d_m v_z / V_m,$$

$$d_{dz} = 1, d_{2y} = 0, d_{2z} = 0.$$

Figure 2A:
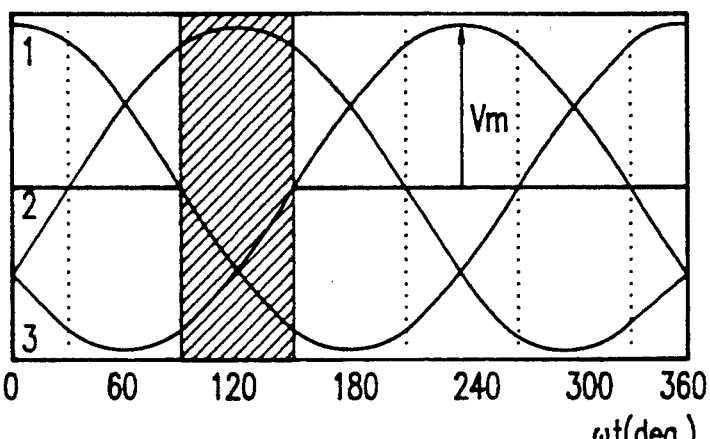
FIG. 2A shows input phase voltages waveforms.
Figure 2B:
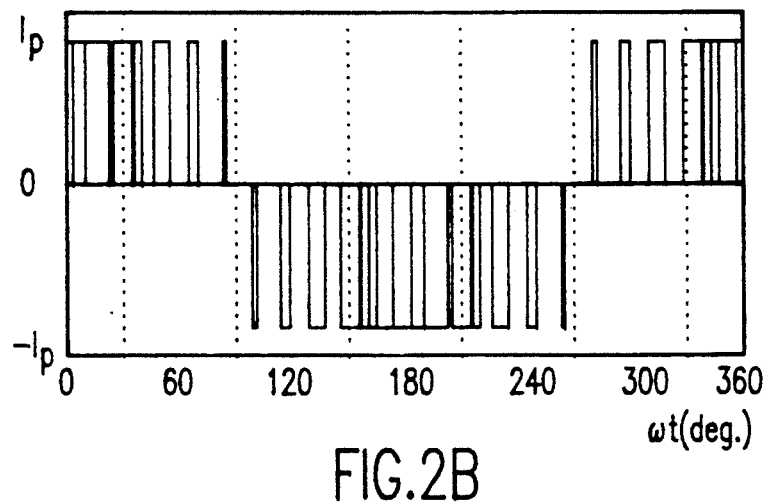
FIG. 2B shows input phase current 1 waveforms.

An example of the waveforms of the input line current $i_1$ and the primary voltage $v_p$ that are obtained with this modulation are shown in FIG. 2, where the switching frequency is 24 times the input frequency, and $d_m = 0.8$.

Figure 1A:
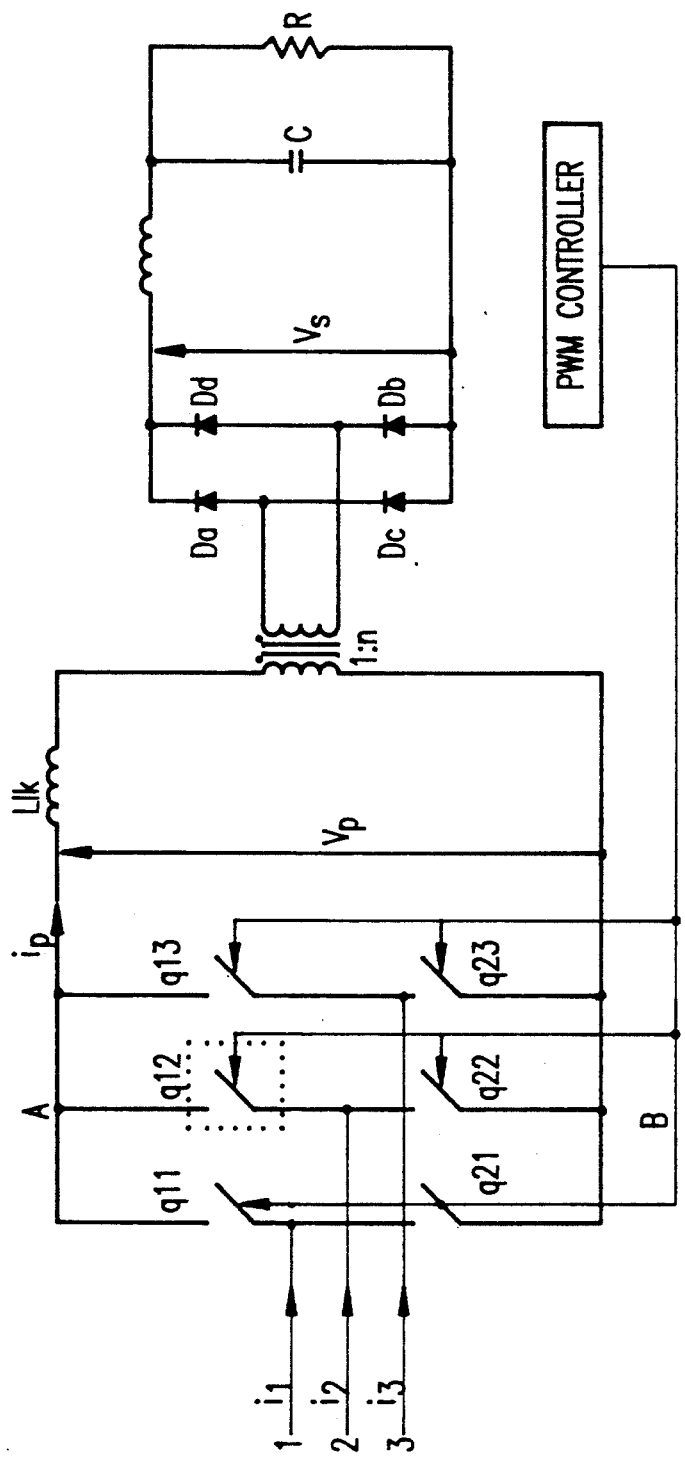
FIG. 1A is a diagram of the rectifier topology.

The above described modulation algorithm is the six-step PWM as presented in the above-reference articles. It should be modified similarly to the method in "A Novel Sinewave in AC to DC Converter with High-Frequency Transformer Isolation", by S. Hanias and P. D. Ziogas, *IEEE Trans. on Industrial Electronics*, Vol. IE-32, no. 4, pp. 430-438, November 1985, so the high-frequency transformer isolation can be used. The primary voltage $v_p$ becomes negative $v_p = -3d_m V_m/2$. The negative $v_p$ will cause the primary current $i_p$ to also be negative, $i_p = -I_p$, and it follows that the average input line currents will still remain in phase with the input phase voltages. Therefore, the primary voltage can be changed from positive to negative at any time without affecting input line currents, provided that the sign of the primary current $i_p$ is also changed synchronously. Because the switch currents and voltages in FIG. 1a now can have both positive and negative signs, the switches $q_{ij}$ have to be four-quadrant. One possible realization of the switch is shown in FIG. 1b.

Figure 2C:
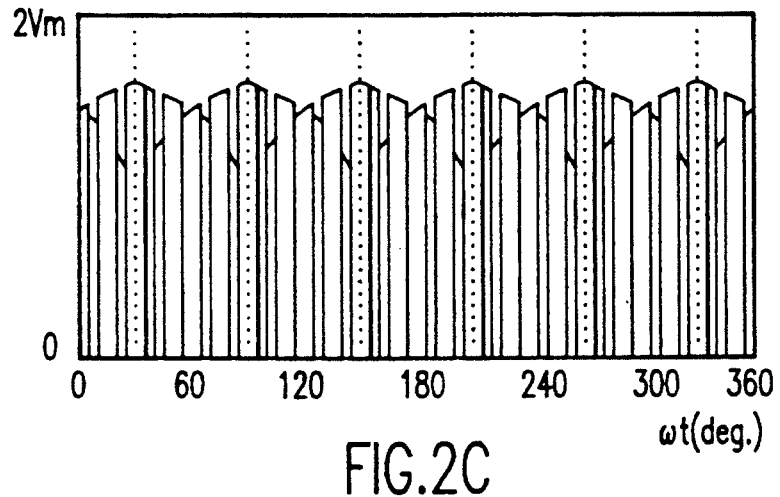
FIG. 2C shows bridge output voltage waveforms waveform.
Figure 3A:
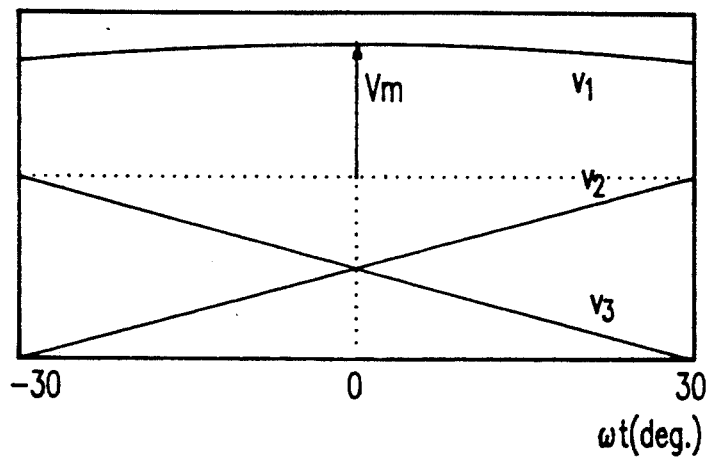
FIG. 3A shows phase voltage waveforms.
Figure 3B:
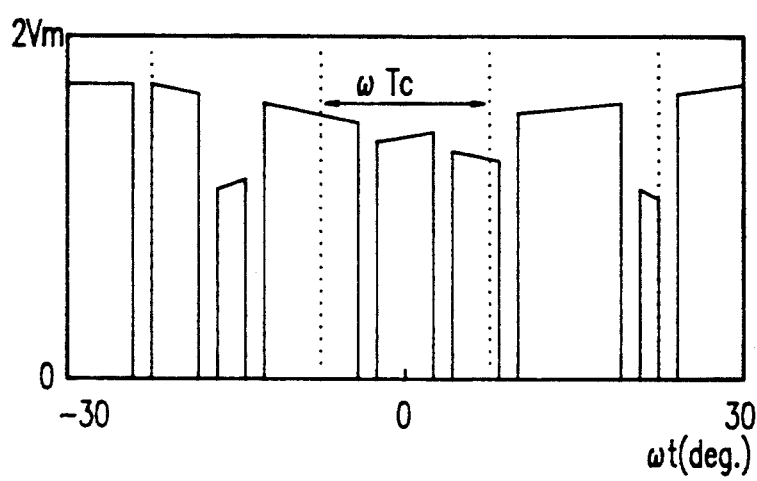
FIG. 3B shows primary voltage with six-step PWM waveforms.
Figure 3C:
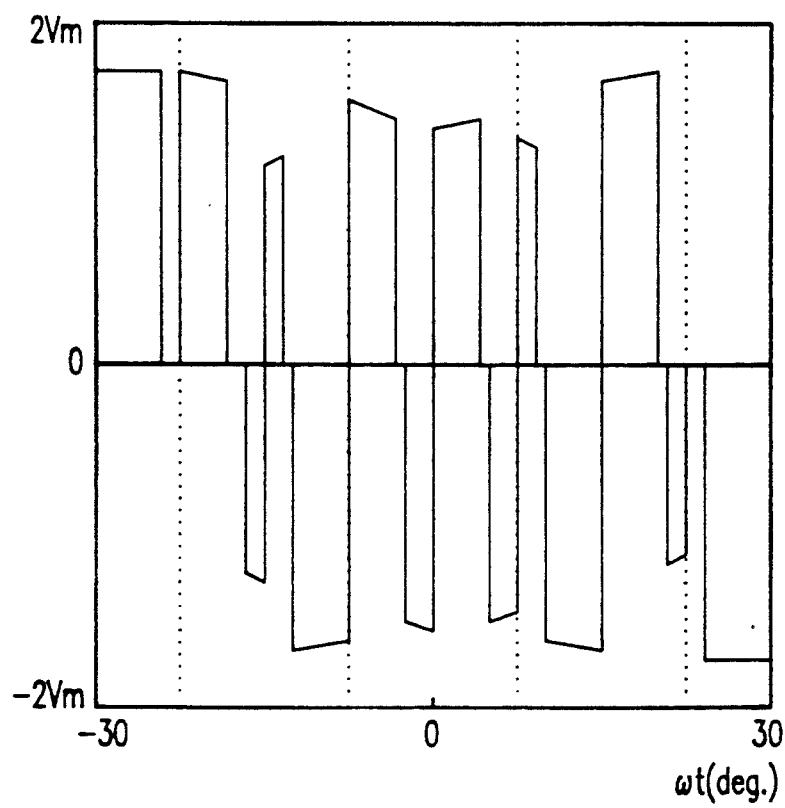
FIG. 3C shows primary voltage with control method of invention waveforms in accordance with the teachings of this invention.
Figure 4A:
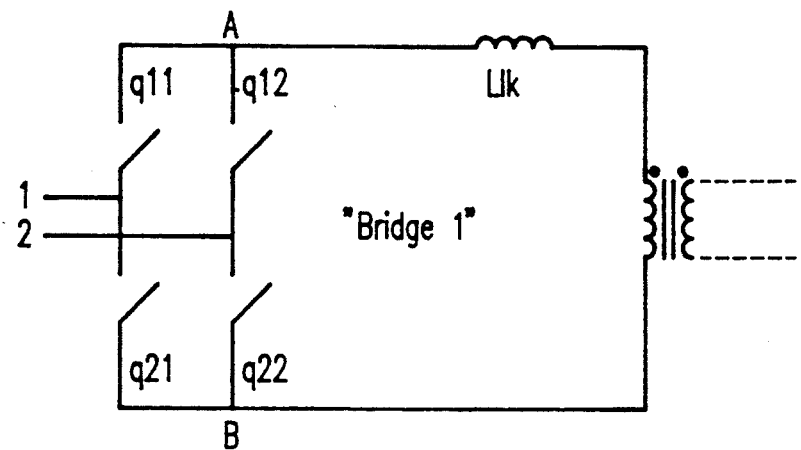
FIGS. 4A and 4B show subtopologies similar to the ZVS-FB-PWM Converter in accordance with the teachings of this invention.
Figure 4B:
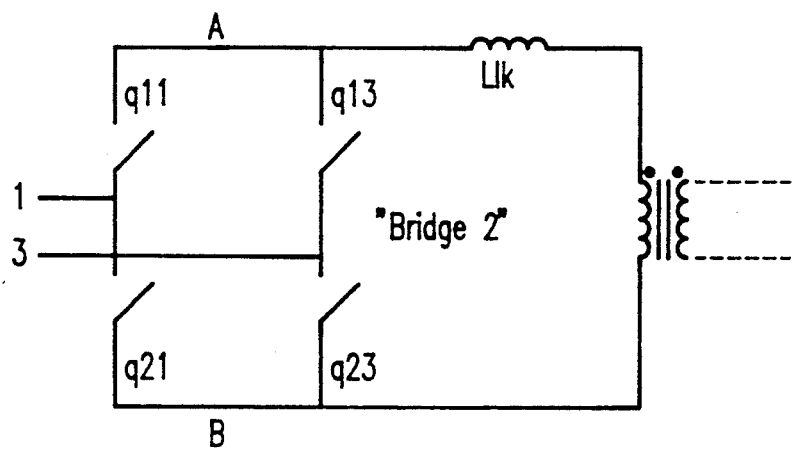

Implementation of the high-frequency cycloconversion is illustrated in FIG. 3. The voltages from FIGS. 2a and 2c are shown expanded during the interval from $-30°$ to $+30°$ in FIGS. 3a and 3b, respectively. In order to eliminate any dc component, each of the pulses in FIG. 3b is split, and every other pulse is inverted in sign. The resulting primary voltage is shown in FIG. 3c. Within this time interval, during each switching period the outer pair of the split voltage pulses is $\pm(v_1-v_2)$, and the inner pair is $\pm(v_1-v_3)$. Therefore, the bridge in FIG. 1 is operated so that one pair of the bipolar output voltage pulses is obtained from the subtopology shown in FIG. 4a and the other pair from the subtopology shown in FIG. 4b. Normally the switching frequency is much larger than that shown in FIG. 3. The input line voltages $v_{12} = v_1 - v_2$ and $v_{13} = v_1 - v_3$, do not change much over many switching periods and can be considered as slowly varying dc, FIG. 3a. Hence, every switching period, each of the subtopologies in FIG. 4 generates one positive and one negative pulse of approximately the same amplitude and duration. Therefore, these subtopologies can be operated in the same way as ZVS-FB-PWM dc-dc converters described in "Designing a High Frequency Snubberless FET Power Inverter", by Z. D. Fang et al., *Proc. of POWERCON 11*, D1-4, pp. 1-10, 1984, and "High-Voltage, High-Power ZVS, Full-Bridge PWM Converter Employing an Active Snubber", by J. A. Sabate et al., *IEEE APEC '91 Proc.*, pp. 158-163, 1991.

Figure 5:
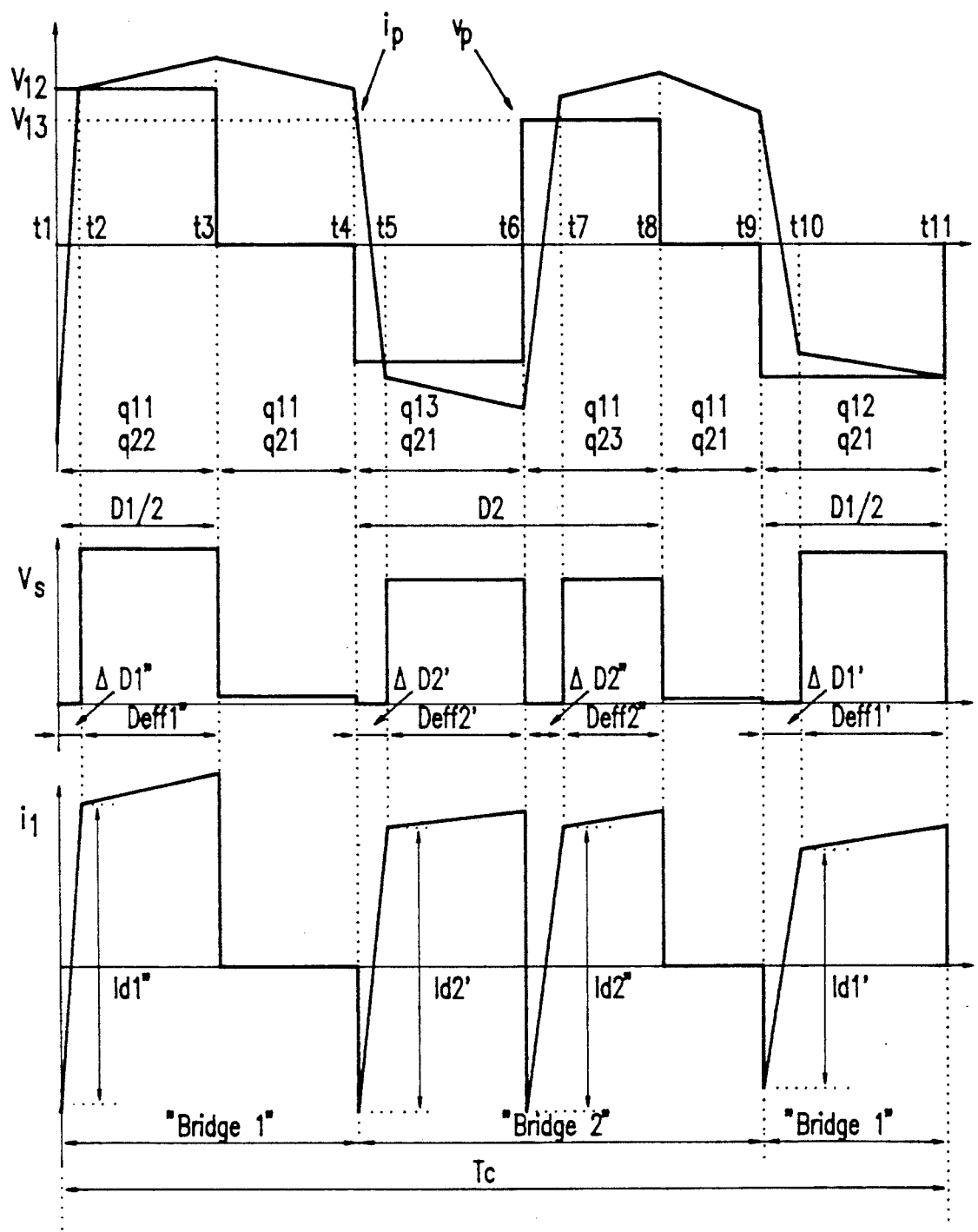
FIG. 5 shows typical circuit waveforms.
Figure 6:
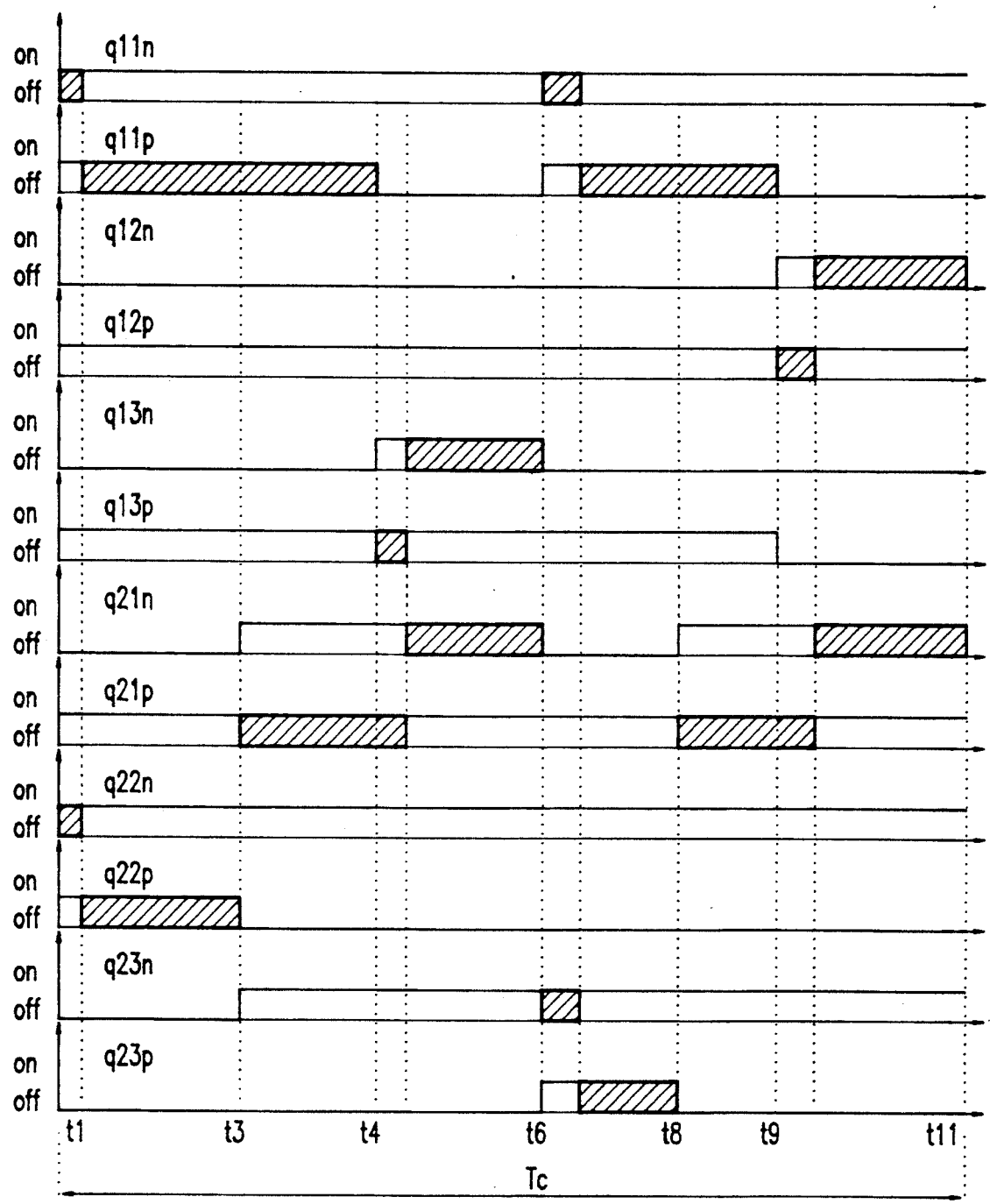
FIG. 6 shows switch-gate-drive waveforms.

FIG. 5 shows the transformer primary voltage, $v_p$, and current, $i_p$, the rectified secondary voltage the primary voltage can be changed from positive voltage, $v_s$, and the current of phase 1, $i_1$, during a high-frequency switching period, within the interval when the phase of the input phase voltages is between $-30°$ and $0°$. FIG. 5 is associated with FIG. 6, showing the gate drive signals for all twelve two-quadrant switches in one high-frequency period. The shaded areas in FIG. 6 denote when a switch is actually carrying current. The two-quadrant switches are named 'p' and 'n', as shown in FIG. 1b, where p denotes the top part of the switches $q_{ij}$ in FIG. 1a and carries a current when $i_p$ is positive.

The switching sequence is best explained using an example. Suppose that $v_1 > v_3 > v_2$ ($-30°$ to $0°$, FIG. 4a). FIG. 6 shows the gate drive signals for all twelve controlled switches during one high-frequency period in this 30° interval. Since $v_1$ is the highest voltage, the switches $q_{11n}$ and $q_{21p}$ are in the on position during this 30-degree interval. In a similar way, since $v_2$ is the lowest voltage, the switches $q_{12p}$ and $q_{22n}$ are held on during this interval. Since the voltage $v_3$ is between $v_1$ and $v_2$, switches $q_{13p}$ and $q_{23n}$ can be kept on during the whole interval except when switches $q_{12}$ or $q_{22}$ are on ($t_9$–$t_{11}$, $t_1$–$t_3$). This is to prevent a short circuit between phases 2 and 3 through the anti-parallel diodes of $q_{13n}$ or $q_{23p}$. The remaining portion of the switches follow the switching sequence shown in FIG. 6. In the interval from 0° to 30°, the switching sequence is exactly the same, except that now the switches $q_{13p}$ and $q_{23n}$ can be kept on during the whole interval, and $q_{12p}$ and $q_{22n}$ have to be turned off while $q_{13}$ and $q_{23}$ are on.

It is seen from this explanation that during this interval, switches $q_{13p}$ and $q_{23n}$ are not switched under zero-voltage conditions. However, the losses produced by this are very low for two reasons. These switches are never switching the full line-to-line voltage, but only the difference between $v_2$ and $v_3$ which varies from 0 to (3 $V_m/2$. Also, since each switch is operated under these conditions only during one 30° period, the switching losses are proportional to $1/(12T_c)$ rather than to $1/T_c$. In the following description, the superscripts '+' and '−' denote time instances 'shortly after' and 'shortly before', respectively. The operation of the circuit in this period is described as follows:

$t_1$ (same as $t_{11}$):

Switches $q_{12}$ and $q_{21}$ are on. The primary voltage is equal to $-v_{12}$, and the primary current is equal to the negative reflected current of the output filter inductor. The input line current is equal to the primary current, and it flows through phases 1 and 2. In the secondary, $D_c$ and $D_d$ are on, and $D_a$ and $D_b$ are blocked. The secondary voltage is equal to the reflected primary voltage.

Figure 7:
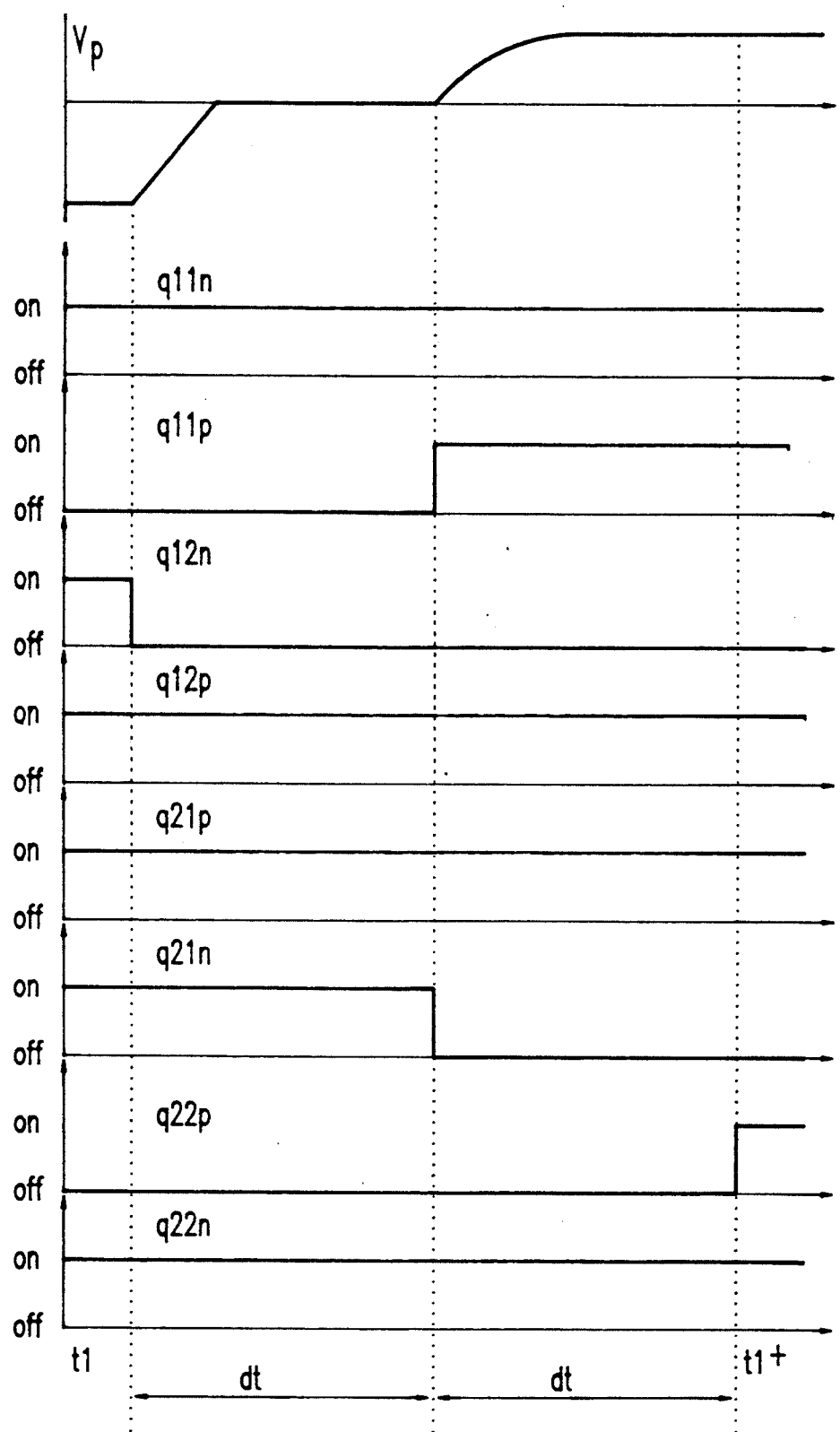
FIG. 7 shows a detail of voltage and gate-drive waveforms.

$t_1$ to $t_1^+$:

Switch $q_{12}$ turns off. Since the control of the switches is somewhat involved during this short interval, the gate drive signals of the related switches are shown in FIG. 7. The leakage inductance in series with the reflected output filter inductances resonates with the equivalent capacitance of the node A, FIG. 1. The primary voltage reduces from $-v_{12}$ in a resonant fashion, and when it reaches zero, it is clamped through the antiparallel diode of switch $q_{11p}$. Input line currents fall to zero. After the diode starts conducting, a positive gate voltage is applied to $q_{11p}$, and the switch is turned on under zero-voltage condition. The short dead-time between turning of $q_{12}$ and turning on $q_{11}$ is denoted by dt in FIG. 7. This time should be determined from the resonant frequency of the equivalent capacitance of node A and leakage inductance. At $t_1+dt$, $q_{21}$ turns off. The leakage inductance resonates with the equivalent capacitance of node B. The primary voltage rises from zero in a resonant fashion, and when it reaches the voltage $v_{12}$, it is clamped through the antiparallel diode of switch $q_{22p}$. The input current $i_1$ decreases to its negative peak. After the diode starts conducting, a positive gate voltage is applied $q_{22p}$, and the switch is turned on under zero-voltage condition. Since the primary current starts reversing, all four rectifiers start conducting thus shorting the secondary of the transformer. The primary current flows through phases 1 and 2.

$t_1^+$ to $t_2^-$:

Since the secondary of the transformer is shorted, the entire primary voltage is applied across the leakage inductance. This determines the slope of the primary current. The primary current flows through phases 1 and 2.

$t_2$ to $t_3$:

At $t_2$, the primary current reaches the reflected current of the output filter inductor. Rectifiers $D_c$ and $D_d$ block, and the secondary voltage rises. The primary current follows the reflected current of the output filter inductor.

$t_3$ to $t_3^+$:

Switch $q_{22}$ turns off. The leakage inductance in series with the reflected output filter inductance resonates with the equivalent capacitance of the node B. The primary voltage reduces from $v_{12}$ in a resonant fashion, and when it reaches zero, it is clamped through the antiparallel diode of switch $q_{21n}$. After the diode starts conducting, a positive gate voltage is applied to $q_{21n}$, and the switch is turned on under zero-voltage condition. The line currents fall to zero.

$t_3^+$ to $t_4^-$:

Switches $q_{11}$ and $q_{21}$ are on. The primary voltage is zero, and the primary current is equal to the reflected current of the output filter inductor. Since $i_p$ is circulating through $q_{11}$ and $q_{21}$, the input line currents remain zero. On the secondary side of the power transformer, $D_a$ and $D_b$ are on, and $D_c$ and $D_d$ are blocked. The secondary voltage is small but not zero, and it is determined by the inductive divider.

$t_4$ to $t_4^+$:

At $t_4$, $q_{11}$ turns off. The leakage inductance resonates with the equivalent capacitance of node A. The primary voltage decreases from zero in a resonant fashion, and when it reaches the voltage $-v_{13}$, it is clamped through the antiparallel diode of switch $q_{13p}$. The primary current starts flowing through the input lines 1 and 3. After the diode starts conducting, a positive gate voltage is applied to $q_{13p}$, and the switch is turned on under zero-voltage condition. All four output rectifiers start conducting, shorting the secondary of the transformer.

$t_4^+$ to $t_t^-$:

Since the secondary of the transformer is shorted, the entire primary voltage is applied across the leakage inductance. This determines the slope of tile primary current. The primary current flows through phases 1 and 3.

$t_5$ to $t_6^-$:

At $t_5$, the primary current reaches the negative reflected current of the output filter inductor. Rectifiers $D_a$, and $D_b$ block, and the secondary voltage rises. The primary current follows the reflected current of the output filter inductor, and flows through phases 1 and 3.

$t_6$ to $t_{11}$:

Operation is similar to that in the time interval $t_1$ to $t_6$ except that Bridge 1 and Bridge 2 are interchanged.

Twelve active switches and four fast rectifier diodes are required for the implementation of the converter. Due to ZVS, MOSFET antiparallel body diodes can be used, so that the additional twelve fast recovery diodes which would be needed otherwise are not required.

Conditions for ZVS switching are not the same for all switching transitions. Referring to FIG. 3, the leading edge transitions at time $t_1$, $t_4$, $t_7$, and $t_{10}$, are utilizing the energy stored in the leakage inductance to charge the parasitic capacitances of the nodes A or B in FIG. 1. However, at the trailing edge transitions at times $t_3$, $t_8$, $t_9$, and $t_{12}$, the leakage inductance is in series with the reflected output filter inductor. The combined energy stored in both the leakage inductance and the output filter inductor is utilized to charge the capacitances of the nodes A or B. Since the energy stored in the output filter inductor is significantly larger than the energy stored in the leakage inductance, ZVS condition can be easily achieved at the trailing edge. Therefore, the ZVS range is determined by resonant transition at leading edges.

The ZVS property is lost when the energy stored in $L_{ik}$ becomes smaller than the energy required to charge the parasitic capacitances of nodes A or B to the input voltage. Since the energy in the capacitances is proportional to the square of the input voltage, the worst case for achieving ZVS will occur when the input voltage is the highest, i.e., $v_p = 3 V_m$, which occurs at $\theta = \pi/5$.

Figure 8:
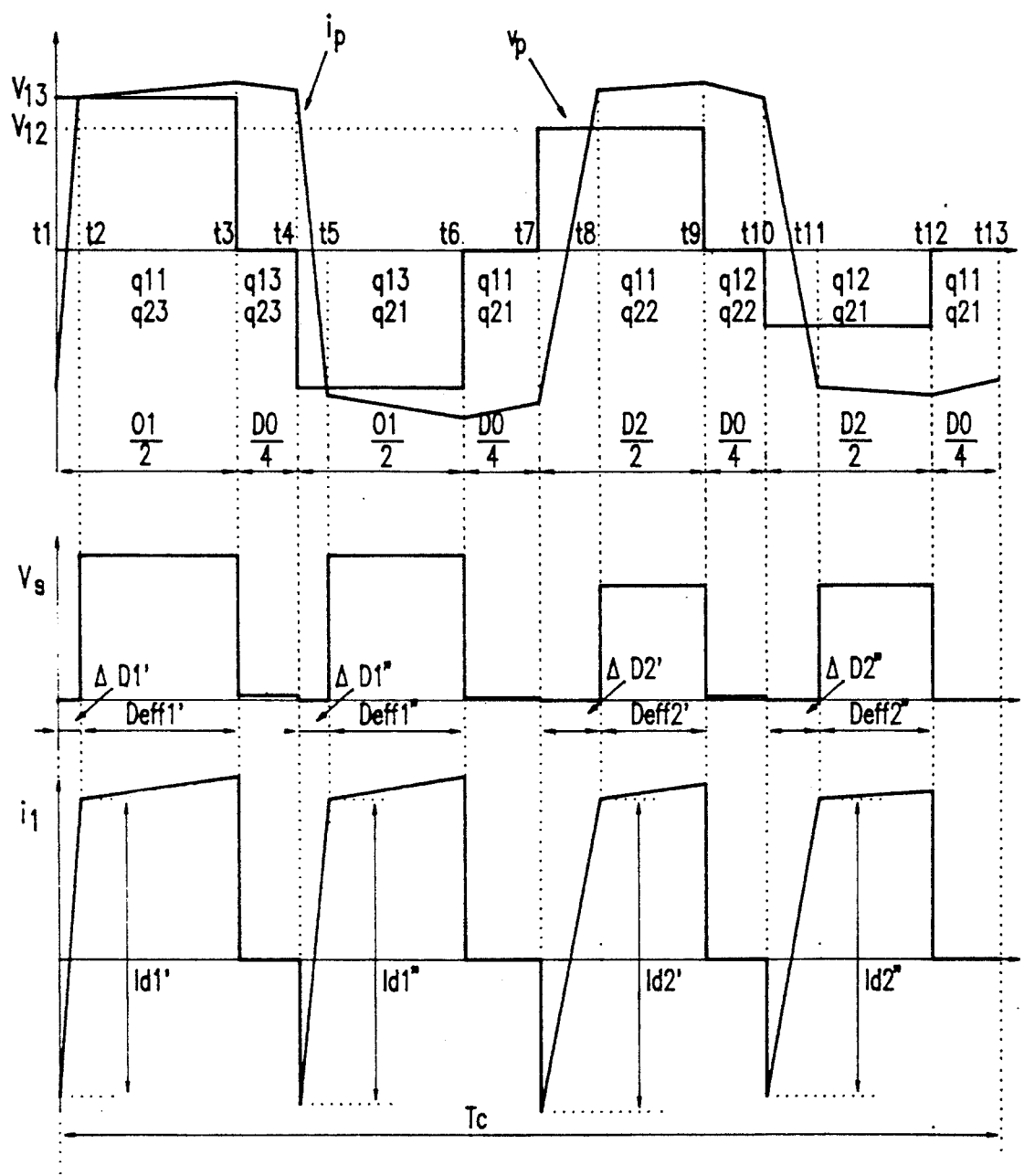
FIGS. 8 and 9 illustrate a specific embodiment of the invention.

Referring now to FIG. 8, it shows waveforms similar to FIG. 5, but modified to avoid saturation. In order to generate a high-frequency ac voltage $v_p$, applied across the primary winding of the transformer, the switching pattern of the bridge is as follows. During the 0° to 30° interval, the voltage $v_{13}$ is larger than $v_{12}$. For the first switching period ($t_1$ to $t_7$), $v_{13}$ it is treated as a slowly varying dc voltage, and only the phase 1 leg of the bridge ($q_{11}$ and $q_{21}$), and the phase 3 leg of the bridge ($q_{13}$ and $q_{23}$) are activated. In this interval, the three-phase bridge behaves like a dc-to-dc converter. During the next switching period, ($t_7$ to $t_{13}$), only $q_{11}$, $q_{21}$, $q_{12}$, and $1_{22}$ are activated, and $-v_{12}$ and $v_{12}$ are applied across the primary of the transformer. The cycle following $t_{13}$ is identical to the first cycle described previously. For this reason, the interval from $t_1$ to $t_{13}$ is defined as the high-frequency carrier period $T_c$.

When the voltage is applied across the transformer at instants $t_1$, $t_4$, etc., the primary current $l_p$ changes with a finite slope due to the presence of the leakage inductance. This causes a delay in inducing the transformer primary voltage to the secondary side. Therefore, the duty cycles of $v_p$ are limited to a value that is less than 1. For this reason, the presence of the leakage inductance has an influence on the characteristics and operation of the converter. Because of ZVS, the four-quadrant switches in FIG. 1, can use the MOSFET body diodes, instead of the additional fast-recovery diodes.

The difference between the waveforms of FIG. 8 and those for the ZVS-FB-PWM converter is that the amplitude of the voltage pulses is slowly varying in time.

Figure 9:
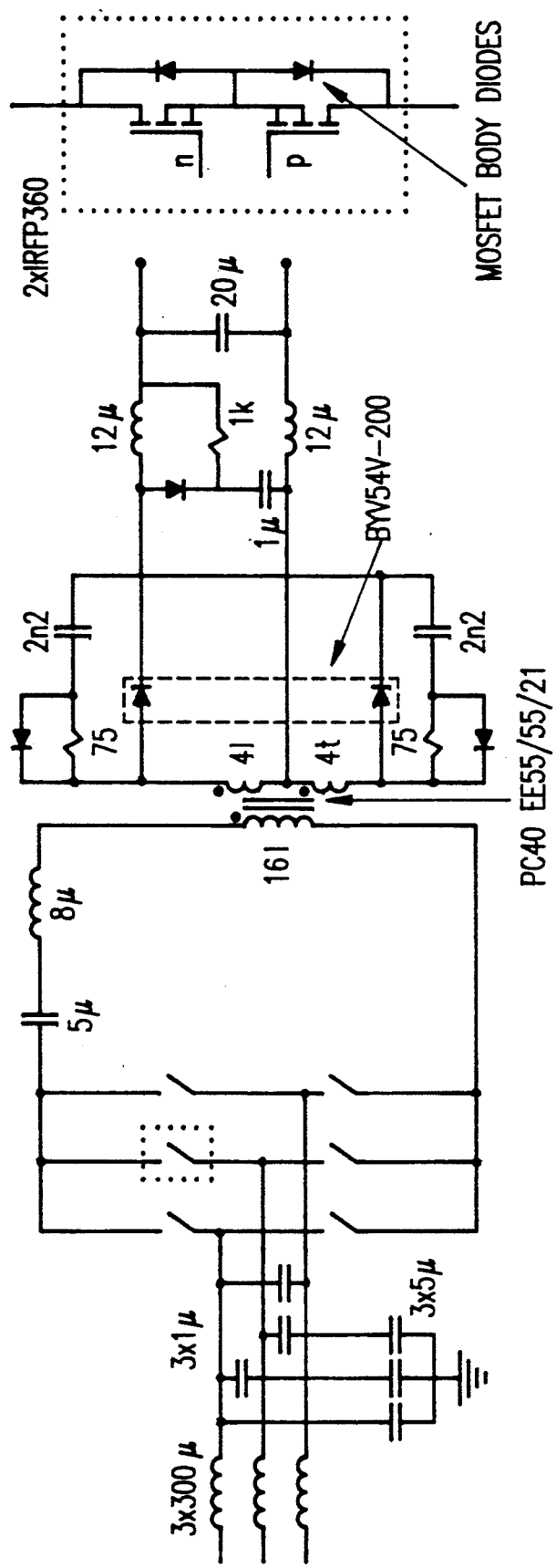

Referring now to FIG. 9, due to the complicated relationship between $T_c$, $L_{1k}$, and D shown in the previous analysis, the design of the converter can be advantageous performed in several iterations. FIG. 9 shows a prototype built to the following specifications:
maximum output power: 2 kW,
output voltage: $v_o = 50$ V, and
input rms line voltage: $3 \times 205$ V.
From these specifications, $V_m = 170$ V. and $l_p{}^{max} = 40$ A.

The carrier period $T_c$ is 22 μs. As shown in FIG. 7, in every carrier period there are four voltage pulses of $v_p$. Therefore, the switching frequency is $1/(T_o/2) = 91$ kHz. This switching frequency has been determined by the speed of the microprocessor system used to control the converter.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A three-phase, zero-voltage-switched, pulse-width-modulated, a.c.-to-d.c.-converter, comprising in combination:
   a transformer having a primary winding and a secondary winding;
   means including rectifying means and filter means for coupling said secondary winding to a load;
   a three-phase input, comprising a first-phase input, a second-phase input, and a third-phase input;
   switching bridge means for coupling said three-phase input means to said primary winding;
   said switching bridge means comprising a first switching means coupled between said first phase input and a first side of said primary winding, second switching means coupled between said first-phase input and a second side of said primary winding, third switching means coupled between said second-phase input and said first side of said primary winding, fourth switching means coupled between said second phase input and said second side of said primary winding, fifth switching means coupled between said third-phase input and said first side of said primary winding, and sixth switching means coupled between said third phase and said second side of said primary winding;
   resonant circuit means, including a leakage inductance of said transformer and a parasitic capacitance of said switching bridge means, said resonant circuit periodically established zero voltage across said first, second, third, fourth, fifth, and sixth switching means;
   means for generating a six-step, pulse-width-modulating signal to switch between an off-state and an on-state said first, second, third, fourth, fifth, and sixth switching means at a zero voltage established by said resonant circuit means and generate a pulse-width-modulated series of in-phase, current and voltage pulses with successive voltage pulses of said series of opposite sign; and
   said means for generating a six-step, pulse-width-modulating signal providing a period of zero transformer primary voltage between each successive voltage pulse of said series.

2. A three-phase, zero-voltage-switched, pulse-width-modulated, a.c.-to-d.c.-converter as in claim 1, wherein each one of said period of zero transformer primary voltage is equal in duration to each other of said period of zero transformer primary voltage.

* * * * *